United States Patent
MacChesney et al.

[11] 3,806,224
[45] Apr. 23, 1974

[54] OPTICAL TRANSMISSION LINE

[75] Inventors: John B. MacChesney, Stirling; Douglas Arthur Pinnow, Berkeley Heights; Legrand Gerard Van Uitert, Morris Twsp., all of N.J.

[73] Assignee: Bell Telephone Laboratories, Incorporated, Murray Hill, N.J.

[22] Filed: Oct. 6, 1972

[21] Appl. No.: 295,717

[52] U.S. Cl. ......... 350/96 WG, 65/DIG. 7, 117/123, 350/96 R
[51] Int. Cl. ............................................. G02b 5/14
[58] Field of Search ................................ 350/96 WG

[56] References Cited
UNITED STATES PATENTS

| | | | |
|---|---|---|---|
| 3,320,114 | 5/1967 | Schulz | 350/175 GN UX |
| 3,542,536 | 11/1970 | Flam et al. | 350/96 WG X |
| 3,647,406 | 3/1972 | Fisher | 350/96 WG X |
| 3,659,915 | 5/1972 | Maurer et al. | 350/96 |
| 3,711,262 | 1/1973 | Keck et al. | 350/96 WG UX |

*Primary Examiner*—John K. Corbin
*Attorney, Agent, or Firm*—W. L. Keefauver

[57] ABSTRACT

Optical transmission lines suitable for transmitting electromagnetic radiation within the visible spectrum and adjoining portions of the infrared and ultraviolet spectra consists of a pure amorphous silica core clad by a pure silica cladding of lowered refractive index relative to the core. Index lowering of the cladding relative to the core is a result of low temperature silica formation, e.g., by chemical vapor deposition. The cladding may manifest a substantial uniform refractive index of a value at least 0.1 percent less than that of the core or may be graded to such a lowered value.

20 Claims, 1 Drawing Figure

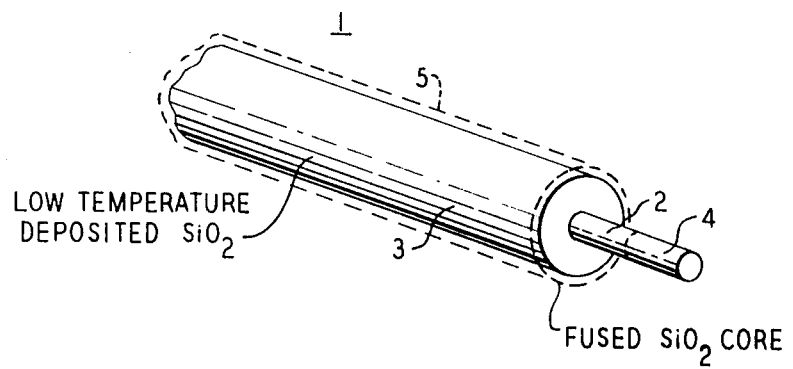

OPTICAL TRANSMISSION LINE

BACKGROUND OF THE INVENTION

1. Field of the Invention

The invention is concerned with glass transmission lines for use within the visible and near-visible spectra.

2. Description of the Prior Art

The possibility of communications systems utilizing coherent or incoherent carriers in the visible and near-visible spectra continues to be of interest. Important considerations include the inherently increased bandwidth resulting from the higher frequencies involved and the decreased space requirements for transmissions lines if used. The latter is emerging as an extremely significant factor particularly in urban areas where cable space is at a premium. This problem is aggravated by the introduction and growing acceptance of broad bandwidth systems, for example for data transmission, rapid facsimile systems, and PICTUREPHONE or other video transmission. Even where requirements are such that the need may not exist for the full bandwidth capability of light communications systems, a comparison, for example, between an optical transmission line and a microwave transmission line operating at the same bandwidth, may result in a preference for the optical system.

While many transmission media have been proposed and are under study for guided light systems, the glass transmission line is, at this time, perhaps closest to commercial fruition. It appears very likely that there will soon be available very thin flexible glass fibers of sufficiently low insertion loss to be feasible.

Many glassy media have been considered and it is still too early to determine what the long term preference may be. However, again with a view to near-term solution, it is apparent that fused silica, $SiO_2$, is an exceedingly promising media for transmission line use in the visible and near-visible spectra. Bulk samples showing an insertion loss of less than 2 dB per kilometer at 1.06 micrometers are now available. Fiber drawing techniques now under study show considerable promise, and it is expected that fiber lines having insertion losses approaching those of the bulk material may soon result.

Thus far, consideration has been given to the medium through which all or most of the wave energy is transmitted. A second consideration involves the guiding function of the line. Most contemplated transmission line structures contemplate a region enveloping the transmission medium. This region, of somewhat lower refractive index than that of the transmission medium itself, may take the form of a cladding of uniform refractive index or of graded index attaining a minimum at a position spaced from the core.

In consequence of the above, there has been a widespread effort to fabricate a clad structure utilizing $SiO_2$. Since this material itself has a rather low refractive index, known prior work has taken the approach of a silica clad-silica core structure with the core index increased by suitable doping. Titania, $TiO_2$, for example, has been used in small quantity (about 1.0 percent by weight) resulting in index increase in the core of the order of the desired level of about 0.3 percent. This approach cannot be ignored but results to date have been somewhat disappointing. Insertion loss for sample structures of this design have been found to be at a level higher than expected for pure silica. Comparison with undoped fibers of similar starting material indicates an increase both in scattering loss and in absorption loss.

SUMMARY OF THE INVENTION

The inventive transmission line structure utilizes the approach complementary to that of the prior art. The core section through which most of the wave energy travels is composed of high purity undoped silica. The requirement of an encompassing section is met by use of silica evidencing a lowered refractive index for the wave energy of concern. Lowering to the required level, of the order of at least one-tenth percent less than that of the core, is accomplished by forming the silica of the encompassing section at a relatively low temperature. The low temperature-formed silica is of lowered density and evidences a lowered index which scales linearly with such lowered density. Sufficient index lowering relative to the core index (1.4585 relative to vacuum as measured at 0.59 micrometer) is accomplished by use of any technique that results in formation of the silica at a temperature of 1,000° C or less. A variety of techniques have been found effective. Exemplary procedures include chemical vapor deposition by decomposition of silicon tetrahalide, silane, or any of the silicon chloroforms, as well as formation from a liquid phase, as by decomposition of an ester of silicic acid such as tetramethoxysilane. A particular procedure, in which formation is from a vapor of silicon tetrachloride, carbon dioxide, hydrogen and oxygen, is preferred particularly for use in the near infrared for the reason that water content is minimized. Retention of water or $OH^-$ results in an absorption peak centered at about 0.95 micrometer which may result in a measurable loss at wavelengths as long as the 1.06 micrometer output of trivalent neodymium doped YAG. The encompassing member may be of substantially uniform lowered index or it may be graded radially to accomplish the graded index structure particularly useful in multimode lines. Grading may result from changing temperature during deposition of the cladding or from diffusion between core and cladding which may be enhanced by deliberate heat treatment.

The invention resides primarily in the described implementation of a desired objective. The undoped silica core manifests the very low insertion loss already associated with this excellent transmission medium. While most of the wave energy is transmitted through this core, a significant fringing portion travels through the guiding medium—usually a cladding. Such a cladding of essentially pure, low temperature silica, in accordance with the invention, may be substantially anhydrous and OH free so that absorption loss is not inherently increased above that of the core even for energy of wavelength within the OH absorption. Various available procedures, while resulting in OH absorption, may suitably be used with energy of wavelength/s lying outside the OH absorption peak. Scattering loss may be somewhat increased due to the somewhat less perfect material resulting from low temperature formation. Even this effect may be minimized by proper attention to processing parameters during formation and/or to annealing subsequent to formation (annealing is, of course, to be carried out at temperatures below the maximum of 1,000° C since densification and consequent index increase otherwise results). Such possible increase in scattering loss is, of course, less significant in the cladding due to the relative small fraction of energy affected by that portion of the guide. Since the cladding may be pure silica, there is no scattering mechanism analogous to that resulting in doped material.

Index differentials or gradients as well as other designed parameters for preferred transmission line structures are described and are of concern in defining preferred embodiments of the invention.

BRIEF DESCRIPTION OF THE DRAWING

The FIGURE is a perspective view of a section of a transmission line structure in accordance with the invention.

DETAILED DESCRIPTION

1. The Drawing

The FIGURE depicts a portion of an optical transmission line 1 constructed of a core section 2 of unmodified, high purity $SiO_2$ and a guiding section shown as cladding 3 composed of a low temperature form of $SiO_2$. The guiding section (cladding 3) may, as discussed, be a single layer of substantially uniform index or two or more layers with each successive layer being of lower index than that underlying so as to approximate a parabolic gradient of particular utility for multimode structures. Cladding 3 may itself, in the alternative, be of graded composition. Also shown is an exemplary means 4 for introducing and/or extracting wave energy into line 1. In this instance, means 4 consists of a section of closely matching index. Means 4 may constitute a coupling between line 1 and a transmitting or detecting means not shown. An additional layer 5, shown in phantom, is a shielding layer designed to avoid crosstalk between adjoining lines. It may consist of any highly absorbent material which is absorbent of the wave energy being transmitted. Exemplary shielding materials for operation in the visible and near-visible spectra are carbon impregnated polyethylene, vapor deposited chrome metallization, and black pigmented polyester resin or paint.

2. Composition

Cladding material, in accordance with the invention, is generally essentially unmodified or pure silica produced by some low temperature technique. Procedures appropriate for formation of such cladding evidencing the required index lowering are discussed under section 3 of this Detailed Description.

Insertion loss of a transmission line of the type under discussion is, in its limit, due to absorption and scattering components of the same order of magnitude. At 1.06 micrometers, the absorption component of the insertion loss for $SiO_2$ may be below 1dB per kilometer. Impurities having absorption levels at a wavelength of concern should be kept at or below a level sufficient to contribute an approximately equal loss. Maintenance of total transition metal ion impurities below the indicated level of $10^{-4}$ percent by weight is generally sufficient for this purpose.

3. Material Preparation

It has been previously recognized that silicon dioxide produced at low temperature is of lesser density and refractive index than material produced by the usual melt technique. See, for example, Vol. 28, No. 1, RCA Review, p. 153 (1967) describing the chemical vapor deposition of $SiO_2$ produced by oxidation of silane. Such a procedure has been utilized to produce a cladding for the inventive purpose by admixture of a first stream of nitrogen diluted oxygen and a second stream of nitrogen diluted silane. Admixture is within a furnace containing a core of fused silica with the furnace maintained at an appropriate temperature, for example, from 1,000° C to 350° C for a period required to produce the desired thickness. The low temperature limit is required for effective oxidation while exceeding the maximum results in densification and, therefore, in an index decrease generally less than 0.1 percent below the value of 1.4585, the latter representing conventional fused silica as measured at a wavelength of 0.59 micrometer. As discussed, grading in index may result from changing temperature during deposition. However, since it is a requirement that the minimum index lowering of 0.1 percent be obtained in some part of the structure, it is a requirement that some part of the deposition be carried out at or below a temperature low enough to produce this difference. Appropriate conditions, such as amounts of gaseous constituents, growth rates, etc., are known, see, for example, RCA Review, supra. An example directed to construction of a structure utilizing the oxidation of silane is set forth in Example 1.

The preferred procedure, where OH absorption is of consequence, involves the oxidation of silicon tetrachloride or tetrabromide. (The minimization of OH is of primary concern for operation in the near infrared, particularly of wavelengths of from about 0.8 to 1.1 micrometers and particularly for single mode structures where relatively large fractions of the transmitted wave energy are in the cladding.) While a variety of techniques for depositing $SiO_2$ from $SiCl_4$ or $SiBr_4$ are known, the preferred procedure involves introduction of the silicon halide with a $CO_2$ carrier. This mixture is admixed with oxygen, hydrogen, and possible additional carbon dioxide within the furnace. Maintenance of the furnace at a temperature within the range of from 500° C to 1,000° C, and preferably from 700° C to 900° C, results in formation of $SiO_2$ evidencing lowered refractive indices typically within the range of from 1.40 to 1.45, as measured at 0.59 micrometers. OH concentrations have been maintained at concentrations below 150 ppm thereby minimizing absorption characteristic of this impurity. Temperature ranges are, again, specified in terms of minima required for effective reaction and maxima designed to avoid densification in consequence in index increase. An example of a procedure found satisfactory for producing the inventive guide by oxidation of $SiCl_4$ is set forth in Example 2.

A third means of preparing low refractive index silica cladding makes use of an unstable liquid phase material. An example is an ester of silicic acid such as tetramethoxy-silane ($Si(CH_3O)_4$). An unclad fiber is wetted, as by immersion, and the fiber is then passed through a furnace where the ester is hydrolyzed using steam. In this example, a temperature range of from 100° to 500° C is suitable. The minimum value is required for effective reaction, while exceeding the maximum, for this particular chemical system, only results in further densification. Other liquid systems, for example, using more stable esters, may be utilized provided $SiO_2$ formation is brought about below the maximum value of 1,000° C, which is required for maintenance of the index value at 0.1 percent below the index for the usual form of fused silica. Example 3, herein, sets forth exemplary parameters suitably used for deposition of an $SiO_2$ cladding layer by this technique.

As described in conjunction with the silane oxidation procedure, index grading for the other method discussed may be accomplished by varying temperature within the permitted ranges—always decreasing temperature for $SiO_2$ formation subsequent to initial formation in contact with the core, and/or by heat treatment always below a level of 1,000° C to bring about a density gradient.

Index of refraction of the test pieces was determined using an Abbe Refractometer.

4. Transmission Line Fabrication

In general, the usual techniques for forming optical glass fibers are not satisfactory for the fabrication of the structures of the invention. These techniques commonly entail drawing of composite preforms or the equivalent. Temperatures on the order of 1,850° C are required to reduce the viscosity of silica to the point at which it can be drawn. These result in densification of the cladding. Suitable procedures generally make use of an already drawn core fiber (which is drawn by conventional technique, for example, by drawing at a temperature of at or above 1,900° C). The drawn fiber is passed through a furnace of sufficient length, at such temperature and rate, as to result in deposition of the desired cladding thickness. Temperature variation within such furnace or use of successive sections maintained at different temperatures or containing different composition may be utilized to produce graded compositions. Deposition of cladding may be carried out in a separate step or may be brought about on an in-line production. Fibers are generally wound on a drum for storage to prevent mechanical damage that could result from contact within adjacent layers. The rotating drum may serve as the motivating means for moving the core through the designated chamber/s.

5. Design Considerations

The following considerations are applicable to the design of any clad optical transmission line. While much of the information is in the literature, it is not readily available from one source.

Of the host of potential fiber designs that are being considered, one stands out as having recognized simplicity and good light guiding characteristics. This is the core-clad fiber shown in the FIGURE in which the index of refraction of the core is $\Delta\eta$ greater than the index of refraction of the cladding $\eta$. By appropriate choice of the core radius, $a$, and $\Delta\eta$, this type of fiber can be either single or multimode. In either case, most of the optical energy of the guided modes is in the core region, although a fraction of the power (~20 percent for single mode and 1 to 2 percent for a highly multimode structure) is in the cladding. The overall optical attenuation, $\alpha_{tot}$, for such a fiber is a superposition of the weighted attenuations in core and cladding materials:

$$\alpha_{tot} = (\text{percent of optical energy in core})\alpha_{core}$$
$$+ (\text{percent of optical energy in clad})\alpha_{clad}$$

(1)

For highly multimode core-clad fibers each of the many guided modes has a well defined velocity of propagation. The fastest mode has its energy directed straight down the axis of the fiber. The off axis modes are slower because their energy is reflected from the core-clad interface many times as they weave their way down a long fiber. This difference in mode velocities limits the information bandwidth (or bit rate) of fiber optical waveguides since energy in an extremely narrow pulse of light directed into the various guided modes of a fiber will be spread out in time as the energy propagates down the length of the fiber. When the spreading reaches the point where adjacent pulses in a bit stream sufficiently overlap, the transmitted information is lost.

Based on well-known principles, it can be shown that the information bandwidth of a highly uniform and highly multimode fiber is related to the difference in refractive indices between the core and the clad, $\Delta\eta$. Specifically, $$\Delta\eta \leq c/L \times B$$

(2)

where $c$ is the velocity of light ($3 \times 10^5$ km/sec), $L$ is the length of the fiber, and $B$ is the maximum information bandwidth. For example, in order to transmit a bandwidth of 30 MHz over a relatively short distance of 1 km, the value of $\Delta\eta$ must be 0.01 or less. It is apparent from the above equation that long distance and broadband transmission require small values of $\Delta\eta$, in fact, the smaller the better. Unfortunately, if $\Delta\eta$ becomes too small the guided light will tend to "leak" excessively out of the fiber when it passes minor fabrication imperfections which inevitably occur during manufacture. The smaller $\Delta\eta$, the greater this loss effect becomes. Thus, to keep optical loss to a reasonable value $\Delta\eta$ must have some minimum value.

For communication applications the useful range of $\Delta\eta$ is between 0.0001 and 0.10 and the preferred range is between 0.001 and 0.02. It should be noted that the $\Delta\eta$ of the $SiO_2$ core and the preferred composition clad range of the invention is in the preferred range.

Although the above discussion concerns only multimode fibers, useful and preferred ranges for $\Delta\eta$ are also applicable to single mode core-clad fibers. In the case of the single mode fibers the reason given above for the lower limit on $\Delta\eta$ is still applicable. However, there is obviously no pulse broadening effect due to differences in mode velocities so that Eq. (2) cannot be used to set an upper limit on $\Delta\eta$. In this single mode case the upper limit is due simply to the fact that the fiber core radius, $a$, is constrained to $$a \leq \lambda/(4\sqrt{2\eta\Delta\eta})$$

(3)

where $\lambda$ is the free space wavelength of the optical signal and $\eta$ is the index of refraction of the cladding. From this well-known equation, it can be seen that as $\Delta\eta$ increases $a$ must decrease. In fact, when $\Delta\eta = 0.02$ one finds $a \approx \lambda$. There are two problems associated with such small core sizes. The first is the practical problem of the mechanical precision necessary to align such small cores for splicing etc. The second problem is fundamental and is associated with non-linear optical effects such as stimulated Brillouin and Raman scattering, which occur when modest optical power (i.e., 10mW) is confined to a very small cross section (i.e., $1\mu$ square). If these non-linear effects occur, useful communication is precluded. A minimum core diameter of the order of about 3 micrometers is prescribed in view of these and other practical considerations. A maximum core diameter of less than 200 micrometers is prescribable to assure mechanical flexibility of the transmission line. The preferred core size is in the range of 30 to 100 micrometers.

The cladding thickness of a core-clad fiber optical waveguide must be sufficiently great that only a very small amount of optical energy from the guided modes penetrates all the way through the cladding to its outer surface. It may be presumed that a substantial fraction of the energy that does reach this outer surface will be lost by absorption due to interaction with surface contaminants or with an absorbing coating that is purposely applied to the fiber to avoid leakage of optical energy from one fiber into adjacent fibers in a bundle. Without such a coating excessive crosstalk between fibers might occur. To avoid excessive optical loss and/or crosstalk, the cladding thickness must be greater than some minimum value. On the other hand, the overall diameter of the fibers must not be too large or the mechanical flexibility of the fiber will be lost.

For communication applications the useful range of cladding thickness, $t$, is $$10\mu \leq t \leq 250\mu$$

while the preferred range is $$25\mu \leq t \leq 100\mu.$$

An optimum transmission line designed for many purposes known as GRIN (graded refractive index) is described in *Applied Optics*, Vol. 9, pp. 753–759, March 1970.

In the GRIN fiber design, the index of refraction varies parabolically with distance from the core axis. The figure below shows the difference between the core-clad and GRIN fibers. The desirable and well-known feature of the GRIN design is that all guided modes propagate with the same velocity, even in a highly multimode structure. Thus, the limitation due to Eq. (2) is no longer applicable and the GRIN fiber is inherently capable of very broad band transmission (as is the single mode fiber).

A GRIN type of fiber may also be made by varying the control parameters during chemical vapor deposition of $SiO_2$ on a very thin silica core.

6. Examples

EXAMPLE 1

Two nitrogen-diluted gas streams are simultaneously introduced into a tube furnace containing a fused silica fiber of ~100 micrometer diameter. Refractive index of the fiber is 1.4585 as measured at 0.59 micrometer. The oxygen stream is the result of the introduction of oxygen at 100 cc per minute and nitrogen at 1,000 cc per minute. A silane stream is produced by a 2 cc per minute introduction of silane as diluted by a 48 cc per minute stream of nitrogen. Temperature within the furnace is maintained at 450° C. A film deposit of about 2 micrometers per hour evidencing a refractive index of 1.452 at 0.59 micrometer results. Infrared absorption measurement indicates water retention to be at a level at about 1 percent by weight based on the deposited $SiO_2$.

EXAMPLE 2

A similar furnace containing a similar core was maintained at a temperature of 830° C. Stream 1 is the result of the bubbling of 50 cc per minute of $CO_2$ through liquid phase $SiCl_4$. A second stream, resulting from the simultaneous introduction of oxygen reactant at 360 cc per minute, hydrogen reactant at 6 cc per minute, and carbon dioxide diluent at 600 cc per minute is admixed with the $CO_2$ carrying $SiCl_4$ within the furnace. Thirty micrometers thick deposits resulted during a 6-hour procedure (5 micrometers per hour). Refractive index, at the said wavelength of 0.59 micrometer, is typically at a level of 1.440 (a variation of flow rates and temperature of within the range of from 600 to 1,000° C resulted in an index range of from 1.443 to 1.437). Infrared absorption showed no peak associated with retained water. Sensitivity of this procedure as practiced was 150 ppm, thereby indicating a water level below this value.

EXAMPLE 3

A 50 micrometer fiber of fused silica is drawn through tetramethoxysilane and through a furnace maintained at a temperature of about 300° C with a steam environment (steam is introduced at a rate sufficient to maintain a suitable rate of hydrolysis). Film thickness is typically 0.5 micrometer per pass and is built up to, for example, 30 micrometers total thickness by 60 cylces. A furnace length of three feet combined with a draw rate of 3 inches per minute is sufficient to effectively hydrolyze the ester. The deposited film index typically is about 1.44 at 0.59 micrometer. Water content, as indicated by infrared absorption, is of the order of 1 percent by weight based on the deposit of $SiO_2$.

What is claimed is:

1. Glass transmission line for the transmission of electromagnetic radiation within the wavelength range of from 0.5 to 2.0 micrometers, said line consisting essentially of a core member manifesting a first refractive index for said wave energy and a cladding about said core, said cladding including at least one layer having a second refractive index for said wave energy which is lower than the said first index, said second index being of a value at least 0.1 percent lower than said first index at least within a region in the neighborhood of a periphery of the said cladding, in which said core and said cladding are both primarily amorphous $SiO_2$, characterized in that the said core consists essentially of $SiO_2$ and in that the said cladding consists essentially of $SiO_2$ formed by chemical conversion, with said formation being brought about within a temperature range of below about 1,000° C.

2. Transmission line of claim 1 in which the said cladding is produced by conversion of a vapor phase material.

3. Transmission line of claim 2 in which the vapor phase material contains a silicon chloride or silicon bromide.

4. Transmission line of claim 3 in which the said silicon compound consists essentially of $SiCl_4$ or $SiBr_4$.

5. Transmission line of claim 4 in which deposition is from a gas mixture containing oxygen.

6. Transmission line of claim 5 in which the deposition is from a gas mixture containing $SiO_2$ and hydrogen.

7. Transmission line of claim 2 in which the said cladding is produced by conversion of silane.

8. Transmission line of claim 7 in which the deposition is from a gas matter containing oxygen and nitrogen.

9. Transmission line of claim 1 in which deposition is from a liquid phase material.

10. Transmission line of claim 9 in which the liquid phase material is a silica ester.

11. Transmission line of claim 10 in which the silica ester consists essentially of tetramethoxysilane.

12. Transmission line of claim 1 in which the core diameter is defined by a region consisting essentially of 99.8 percent by weight $SiO_2$ with transition metal ion impurities no greater than $10^{-4}$ percent and having a maximum refractive index variation of 0.01 percent from 3 micrometers to 200 micrometers.

13. Transmission line of claim 12 in which the core diameter defining a region consisting essentially of 99.8 percent by weight $SiO_2$ with transition metal ion impurities no greater than $10^{-4}$ percent and having a maximum refractive index variation of 0.01 percent is from 30 micrometers to 100 micrometers.

14. Transmission line of claim 12 in which the cladding thickness defined as the thickness of amorphous material, the composition of which is primarily $SiO_2$ but within which the refractive index has a differential value relative to the said core greater than the variations specified in claim 12 is from 10 to 250 micrometers.

15. Transmission line of claim 14 in which the cladding thickness as defined is from 25 to 100 micrometers.

16. Transmission line of claim 15 in which the core dimension is within the range of from 3 micrometers to 200 micrometers.

17. Transmission line of claim 1 in which the refractive index differential between the said region and the core is from 0.0001 to 0.10.

18. Transmission line of claim 17 in which the refractive index differential between the said region and the core is from 0.001 to 0.02.

19. Transmission line of claim 1 in which the refractive index of the cladding is substantially uniform in the radial direction.

20. Transmission line of claim 1 in which the refractive index of the said cladding is graded with the index decrease in the radial direction away from the said core.

* * * * *